(12) United States Patent
Cao et al.

(10) Patent No.: US 6,368,491 B1
(45) Date of Patent: Apr. 9, 2002

(54) METHOD OF CONTROLLING A MODULAR CERAMIC OXYGEN GENERATING SYSTEM

(75) Inventors: Tuan Q. Cao, Davenport; Russell F. Hart, Blue Grass, both of IA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/708,091

(22) Filed: Nov. 8, 2000

(51) Int. Cl.⁷ .................................................. C25C 1/10
(52) U.S. Cl. ..................... 205/634; 205/633; 204/228.1; 204/229.4; 204/229.8; 204/230.2; 95/45; 95/54; 96/4; 96/6; 96/10
(58) Field of Search .................................. 205/634, 633; 204/228.1, 229.4, 229.8, 230.2; 95/45, 54; 96/4, 6, 10

(56) References Cited

U.S. PATENT DOCUMENTS

| | | | |
|---|---|---|---|
| 5,186,793 A | 2/1993 | Michaels | 204/59 R |
| 5,332,483 A | 7/1994 | Gordon | 204/265 |
| 5,441,610 A | 8/1995 | Renlund et al. | 204/129 |
| 5,855,762 A * | 1/1999 | Phillips et al. | 205/634 |
| 5,858,063 A * | 1/1999 | Cao et al. | 95/11 |
| 5,871,624 A | 2/1999 | Crome | 204/286 |
| 5,985,113 A | 11/1999 | Crome et al. | 204/286 |

FOREIGN PATENT DOCUMENTS

| | | |
|---|---|---|
| WO | WO99/48595 | 3/1998 |

\* cited by examiner

Primary Examiner—Bruce F. Bell
(74) Attorney, Agent, or Firm—Lowe Hauptman Gilman & Berner, LLP

(57) ABSTRACT

The invention relates generally to ceramic oxygen generating modules, and more particularly, to an apparatus and method for controlling a duty cycle for each of a plurality of ceramic oxygen generating modules in a modular ceramic oxygen generating system.

18 Claims, 2 Drawing Sheets

METHOD OF CONTROLLING A MODULAR CERAMIC OXYGEN GENERATING SYSTEM

RELATED APPLICATIONS

The present application is related to co-pending U.S. patent application Ser. No. 09/626,794, entitled "THIN FILM MODULAR ELECTROCHEMICAL APPARATUS AND METHOD OF MANUFACTURE THEREFOR", filed Jul. 26, 2000 still pending; U.S. Pat. No. 5,871,624 entitled "MODULAR CERAMIC OXYGEN GENERATOR", issued Feb. 19, 1999; U.S. Pat. No. 5,985,113 entitled "MODULAR CERAMIC ELECTROCHEMICAL APPARATUS AND METHOD OF MANUFACTURE THEREFOR, issued Nov. 16, 1999; U.S. patent application Ser. No. 09/418,831 (continuation of U.S. Pat. No. 5,985,113), allowed Aug. 11, 2000 now U.S Pat. No. 6,194,335; and U.S. patent application Ser. No. 09/573,891 entitled "ELECTROCHEMICAL OXYGEN GENERATING SYSTEM", filed May 19, 2000, still pending, and are hereby incorporated by reference into this specification in its entirety.

FIELD OF THE INVENTION

The present invention relates generally to ceramic oxygen generating modules, and more particularly, to an apparatus and method for controlling a duty cycle for each of a plurality of ceramic oxygen generating modules in a modular ceramic oxygen generating system.

BACKGROUND OF THE INVENTION

Several ceramic oxygen generating modules have been disclosed in U.S. patent application Ser. No. 09/626,794, U.S. Pat. No. 5,871,624, U.S. Pat. No. 5,985,113, U.S. Pat. No. 6,194,335, and U.S. patent application Ser. No. 09/573,891. Although each of the disclosed ceramic oxygen generating modules produces oxygen, each module is typically limited to 0.25 liters per minute (LPM) of oxygen. Many medical oxygen applications require that a patient be provided up to five LPM of oxygen. That means that up to twenty modules may be required for a modular ceramic oxygen generating system. However, some patients may require less than the maximum required output, for example, one LPM. In a twenty module oxygen generating system capable of producing up to five LPM of oxygen, if only the first four modules were used to produce one LPM, then the first four oxygen generating modules would prematurely age and the overall life of the modular ceramic oxygen generating system would be considerably reduced. Thus, a need exists in the art for a method and apparatus to extend the life of a ceramic oxygen generating system having greater oxygen generating capacity than is required for most situations.

SUMMARY OF THE INVENTION

It is, therefore, an object of the present invention to provide a method and apparatus to extend the life of a ceramic oxygen generating system having greater oxygen generating capacity than is required for most situations.

Another object of the present invention is to provide a method and apparatus for controlling the output of a modular ceramic oxygen generating system.

Yet another object of the present invention is to provide a method and apparatus for controlling an duty cycle of a modular ceramic oxygen generating system which is capable of partially energizing an additional module to provide flow in increments in less than the capacity of a single module.

It is another object of the present invention to provide a method and apparatus for providing power to all the modules in a predetermined time period.

These and other objects of the present invention are achieved by a method of controlling a duty cycle for each of $m_1 \ldots m_n$ ceramic oxygen generating modules. Power is first supplied to less than n of the ceramic oxygen generating modules such that modules $m_1 \ldots m_x$ provide oxygen gas output. Power is then supplied to ceramic oxygen generating modules $m_2 \ldots m_{x+1}$ which provide the oxygen gas output.

The foregoing and other objects of the present invention are achieved by an apparatus for controlling a duty cycle of an oxygen generating system, including $m_1 \ldots m_n$ ceramic oxygen generating modules manifolded together. A controller is electrically connected to each of $m_1 \ldots m_n$ ceramic oxygen generating modules. The controller is capable of first supplying power to less than n of the ceramic oxygen generating modules such that ceramic oxygen generating modules $m_1 \ldots m_x$ provide oxygen gas output and then is capable of supplying power to ceramic oxygen generating modules $m_2 \ldots m_{x+1}$ to provide oxygen gas output.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
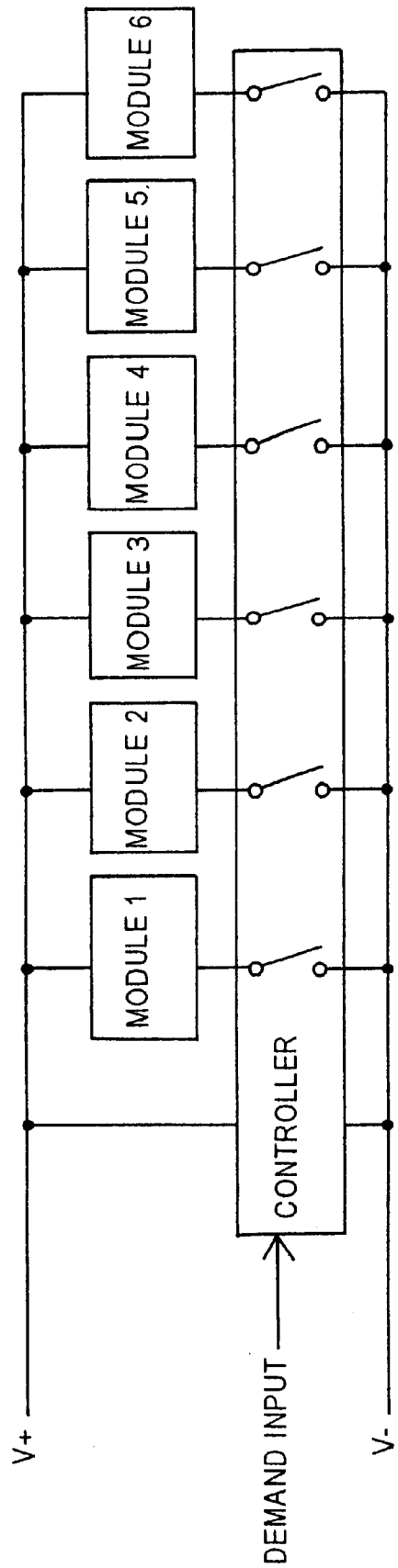
FIG. 1 is a high level electrical schematic diagram of a six module ceramic oxygen generating system according to the present invention.

Referring now to FIG. 1, a six module ceramic oxygen generating system, is depicted. Of course, any number of modules can be used depending upon oxygen flow requirements. Six modules were depicted for convenience only. As depicted in FIG. 1, the oxygen generating system 10 includes a controller 20 and six oxygen generating modules, 30, 32, 34, 36, 38 and 39. The controller includes six switches, 40, 42, 44, 46, 48 and 49, connected respectively to modules 30, 32, 34, 36, 38 and 39. The controller 20 can either be implemented as microprocessor based or as an analog circuit, or in any known manner. Each of the switches 40–49 can be a separate discrete switch or can be implemented on an integrated circuit. As depicted in FIG. 1, the controller 20 receives a demand input. Also as depicted in FIG. 1, each of the modules and switch pairs 30, 40; 32, 42; 34, 44; 36, 46; 38, 48; and 39, 49 are connected in parallel to a voltage source. Similarly, the controller 20 can be connected in parallel to the same voltage source.

As described herein, each of the oxygen generating modules has the same oxygen output capacity, different size oxygen modules having different output capacities could also be used in the present invention.

The present invention defines a method of providing a specified flow of oxygen from the ceramic oxygen generating system 10 using the series of similar oxygen generating modules 30–39. The present invention can use the ceramic oxygen generating modules disclosed in U.S. patent application Ser. No. 09/626,794, entitled "THIN FILM MODULAR ELECTROCHEMICAL APPARATUS AND METHOD OF MANUFACTURE THEREFOR", filed Jul. 26, 2000; U.S. Pat. No. 5,871,624 entitled "MODULAR CERAMIC OXYGEN GENERATOR", issued Feb. 19, 1999; U.S. Pat. No. 5,985,113 entitled "MODULAR CERAMIC ELECTROCHEMICAL APPARATUS AND METHOD OF MANUFACTURE THEREFOR, issued Nov. 16, 1999; U.S. patent application Ser. No. 09/418,831 (continuation of U.S. Pat. No. 5,985,113), allowed Aug. 11, 2000; and U.S. patent application Ser. No. 09/573,891 entitled "ELECTROCHEMICAL OXYGEN GENERATING SYSTEM", filed May 19, 2000. Each module 30–39 is capable of generating a fraction of a liter per minute of 100% oxygen.

As an example, assume that each module is sized to provide a flow of 0.25 liters per minute (module capacity= 0.25). Then, for an oxygen generator capable of generating 3 liters per minute, 12 modules would be required. It is desirable for an oxygen generator system to be adjustable over the range of 0 to 3 liters per minute while maintaining the minimum practical power requirement for each reduced flow. The present invention provides infinite flow adjustment between 0–3 LPM by turning the appropriate number of modules 30–39 completely on and modulating an additional module to provide flow in increments of less than the capacity of a single module. The number of modules and duty cycle to be used for the modulated module is calculated using the following algorithm:

Number modules to be turned on=INT (Flow demand/Module capacity) where INT is integer function.

Duty cycle of additional module=(Flow demand−Number modules to be turned on*Module capacity)/(Module capacity). Using the example, suppose that a flow of 1.6 liters per minute is desired.

Number modules to be turned on=INT(1.6/0.25)=6.

Duty cycle=(1.6−6*0.25)/0.25=40%.

To provide this flow, 6 modules would be turned on (6 times 0.25=1.5) and a seventh module would be turned on at a 40% duty cycle (40% of 0.25=0.1) to yield 1.6 liters per minute (1.5 plus 0.1=1.6). The controller 20 provides all the signals required to cycle power to the correct modules at the appropriate time under the influence of the demand input which can be provided by either an analog or a digital input signal.

However, not all modules are to be on at the same time operating in this mode. This could result in some modules being aged more than others. In order to assure that all modules are used approximately equally, the controller 20 cycles power to all modules 30–39 in a predetermined time period (for example 30 minutes). Since each module is, in turn, supplied with an appropriate voltage/current, the characteristics of a particular module can be "programmed" into the controller and any deviations from the "standard" voltage/current will be supplied at the appropriate time for the activation of that module. This could be done to, for example, compensate for a degrading module by increasing the voltage as the module degrades to maintain an equivalent output current.

Figure 2:
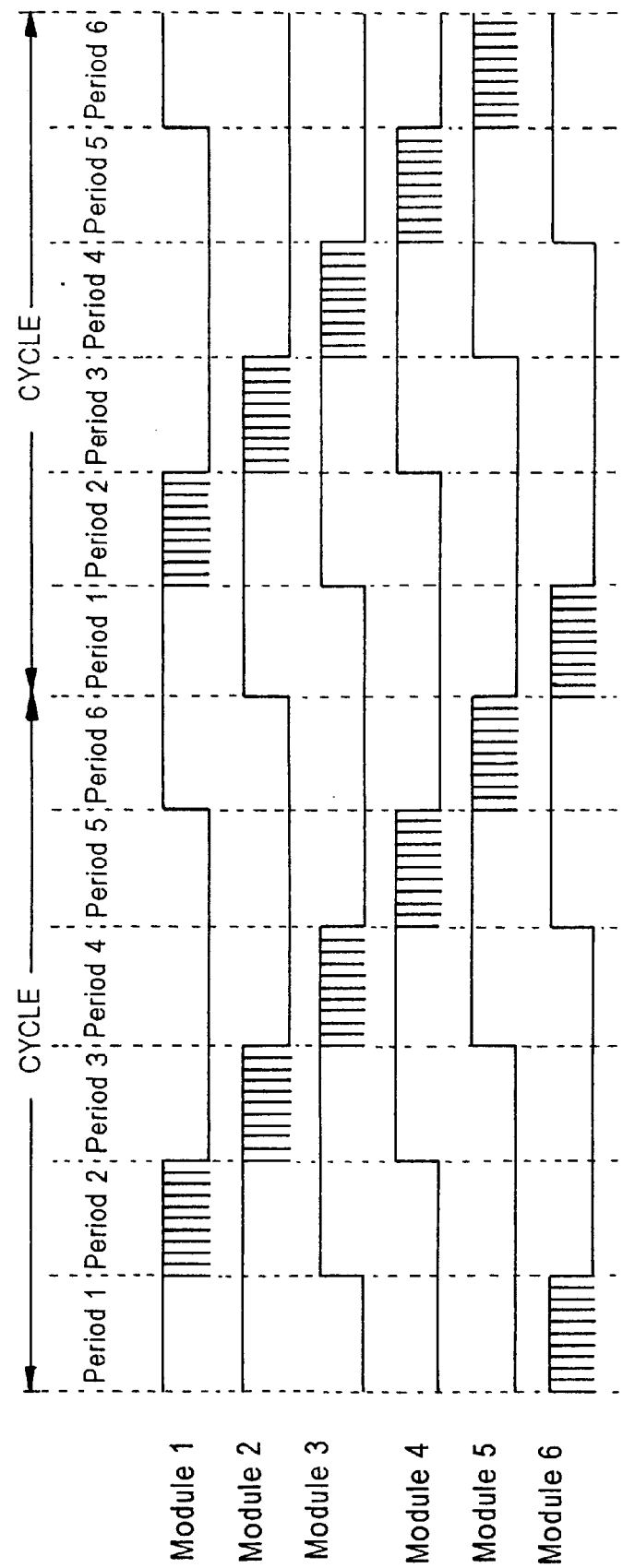
FIG. 2 is a timing diagram for a first and second cycle for each of the six modules depicted in FIG. 1.

As shown in FIG. 2, an example where two modules are to be turned on in the six-module system depicted in FIG. 1, the complete cycle consists of six time periods with different modules turned on and modulated. As depicted in FIG. 2, for the first cycle, module 1 is completely on for periods 1 and 6 and is modulated in period 2. During the second cycle, module 1 is completely on in period 1 and is modulated in period 2. Similarly, modules 2–6 are either completely on or modulated during each period in cycle. Thus, for example, in period 1 of the first cycle, modules 1 and 2 are completely on and module 6 is modulated. Hence, the flow output is somewhere between 0.5 LPM and less than 0.75 LPM.

It should also be understood that a variable power supply could be used in place of the duty cycle modulation of an individual module. For instance the duty cycle modulation could be performed as in a DC-to-DC converter power supply that converts from some higher voltage to a lower, controlled voltage that supplies the module.

It should now be apparent that a controller for a ceramic oxygen generating system has been disclosed which can improve the life expectancy of a ceramic oxygen generating system. Advantageously, if one or more modules fail or degrade, the remaining modules can be used while the failed modules are removed from the power application progression.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of controlling a duty cycle for each of $m_1 \ldots m_n$ ceramic oxygen generating modules, comprising:

first supplying power to less than n of the ceramic oxygen generating modules such that modules $m_1 \ldots m_x$ provide oxygen gas output; and second supplying power to ceramic oxygen generating modules $m_2 \ldots m_{x+1}$ provide oxygen gas output.

2. The method of claim 1, wherein said first supplying step supplies full power to modules $m_1 \ldots m_x$.

3. The method of claim 1, wherein said first supplying step supplies full power to module $m_1 \ldots m_{x-1}$.

4. The method of claim 3, wherein said first supplying step provides partial power to module $m_x$.

5. The method of claim 1, wherein said first supplying step supplies full power to less than all of the modules according to the equation:

number modules to be turned on=INT (Flow demand/Module capacity) where INT is integer function.

6. The method of claim 5, comprising modulating the power supplied to a module according to the equation:

duty cycle of additional module=(Flow demand−Number modules to be turned on*Module capacity)/(Module capacity).

7. The method of claim 1, comprising switching from said first supplying step to said second supplying step after a predetermined period of time.

8. The method of claim 1, wherein $m_n=12$ and the oxygen flow output for each of the modules is 0.25 LPM so that the maximum total output flow is 3 LPM.

9. The method of claim 1, comprising receiving a demand input signal.

10. An apparatus for controlling a duty cycle of an oxygen generating system, comprising:

$m_1 \ldots m_n$ ceramic oxygen generating modules manifolded together;

a controller electrically connected to each of $m_1 \ldots m_n$ ceramic oxygen generating modules;

wherein said controller is capable of first supplying power to less than n of said ceramic oxygen generating modules such that ceramic oxygen generating modules $m_1 \ldots m_x$ provide oxygen gas output and then is capable of supplying power to ceramic oxygen generating modules $m_2 \ldots m_{x+1}$ to provide oxygen gas output.

11. The apparatus of claim 10, wherein said controller supplies full power to modules $m_1 \ldots m_x$.

12. The apparatus of claim 11, wherein said controller supplies partial power to module $n_x$.

13. The apparatus of claim 10, wherein said controller supplies full power to modules $m_1 \ldots m_{x-1}$.

14. The apparatus of claim 10, wherein said controller supplies full power to less than all the modules according to the equation:

number modules to be turned on=INT (Flow demand/Module capacity) where INT is integer function.

15. The apparatus of claim 14, wherein said controller modules the power supplied to a module according to the equation:

duty cycle of additional module=(Flow demand−Number modules to be turned on*Module capacity)/(Module capacity).

16. The apparatus of claim 10, wherein said controller switches from supplying power from modules $m_1 \ldots m_x$ to modules $m_2 \ldots m_{x+1}$ after a predetermined period of time.

17. The apparatus of claim 10, wherein n=12 and the oxygen flow output for each of the modules is 0.25 LPM so that the maximum total output flow is 3 LPM.

18. The apparatus of claim 10, further comprising means for determining a flow demand used by the controller to determine how many modules should be supplied power.

* * * * *